(12) United States Patent
da Silva et al.

(10) Patent No.: US 9,868,158 B2
(45) Date of Patent: Jan. 16, 2018

(54) AUTOMATIC BALANCING DEVICE FOR BORING HEADS

(71) Applicant: Kennametal Inc., Latrobe, PA (US)

(72) Inventors: Marcelo Euripedes da Silva, Indaiatuba (BR); Elio Andia, Indaiatuba (BR)

(73) Assignee: KENNAMETAL INC., Latrobe, PA (US)

( * ) Notice: Subject to any disclaimer, the term of this patent is extended or adjusted under 35 U.S.C. 154(b) by 168 days.

(21) Appl. No.: 14/506,015

(22) Filed: Oct. 3, 2014

(65) Prior Publication Data

US 2016/0096226 A1 Apr. 7, 2016

(51) Int. Cl.
 *B23B 29/034* (2006.01)
(52) U.S. Cl.
 CPC .... *B23B 29/03417* (2013.01); *B23B 2250/04* (2013.01); *Y10T 408/8588* (2015.01); *Y10T 408/85895* (2015.01)
(58) Field of Classification Search
 CPC ........... B23B 29/03417; B23B 2250/04; Y10T 408/858957; Y10T 408/85895; Y10T 408/85892; Y10T 408/8588
 See application file for complete search history.

(56) References Cited

U.S. PATENT DOCUMENTS

| | | |
|---|---|---|
| 4,175,894 A | 11/1979 | Skrentner |
| 4,229,127 A | 10/1980 | Bartley |
| 4,626,144 A | 12/1986 | Berner |
| 5,174,697 A | 12/1992 | Ariyoshi |
| 5,251,511 A | 10/1993 | Muendlein et al. |
| 5,316,417 A | 5/1994 | Romi |
| 5,326,198 A * | 7/1994 | Romi ................ B23B 29/03446 408/153 |
| 5,478,177 A | 12/1995 | Romi |
| 5,611,651 A * | 3/1997 | Wohlhaupter .... B23B 29/03403 408/143 |
| 5,836,727 A | 11/1998 | Scheer |
| 5,902,078 A | 5/1999 | Kaiser et al. |
| 5,909,986 A * | 6/1999 | Kaiser ............... B23B 29/03492 408/143 |

(Continued)

FOREIGN PATENT DOCUMENTS

| | | |
|---|---|---|
| CN | 101474681 A | 7/2009 |
| CN | 201361719 Y | 12/2009 |

(Continued)

OTHER PUBLICATIONS

Wohlhaupter, Boring tools for finish machining, Wohlhaupter Catalong, F.7.0-F.7.3.

(Continued)

*Primary Examiner* — Eric A Gates
(74) *Attorney, Agent, or Firm* — Ian K. Samways

(57) ABSTRACT

A boring head includes a housing having a first end configured to be coupled to a machine tool and a second end positioned opposite from the first end with the housing defining a central passageway. The boring head also includes a diameter adjustment mechanism comprising a sliding holder received by the housing and movable relative to the housing with the sliding holder configured to be coupled to a cutting insert and a balancing mechanism having a balancing mass. The balancing mechanism is configured to move the balancing mass when the sliding holder is moved. The balancing mass is aligned with the sliding holder in a direction extending about perpendicular to a longitudinal axis of the housing.

19 Claims, 4 Drawing Sheets

(56) References Cited

U.S. PATENT DOCUMENTS

| | | | |
|---|---|---|---|
| 5,971,675 A * | 10/1999 | Romi | B23B 29/03417 408/161 |
| 6,053,082 A | 4/2000 | Rupp et al. | |
| 7,260,877 B2 | 8/2007 | Broadley | |
| 7,585,139 B2 | 9/2009 | Stadelmann et al. | |
| 7,871,226 B2 * | 1/2011 | Fronius | B23B 29/03492 408/143 |
| 8,684,638 B2 * | 4/2014 | Buck | B23B 29/03407 408/16 |
| 8,727,678 B2 | 5/2014 | De Souza et al. | |
| 2004/0228695 A1 | 11/2004 | Clauson | |
| 2012/0269590 A1 | 10/2012 | Buck | |
| 2013/0064616 A1 * | 3/2013 | Nakamura | B23B 29/03421 408/1 R |
| 2013/0064618 A1 * | 3/2013 | Frota De Souza | B23B 29/03417 408/143 |
| 2016/0096226 A1 | 4/2016 | da Silva | |

FOREIGN PATENT DOCUMENTS

| | | | |
|---|---|---|---|
| DE | 3926026 A1 | 2/1991 | |
| DE | 10244857 | 4/2004 | |
| DE | 102009051843 A1 | 5/2011 | |
| DE | 202015103584 U1 * | 7/2015 | B23B 29/03407 |
| FR | 2568501 | 2/1986 | |
| WO | WO 2013026569 A1 * | 2/2013 | B23B 29/03489 |

OTHER PUBLICATIONS

Kaiser Precision Tooling Ltd., Kaiser Series 112 EWB, www.kaisertooling.com, accessed Oct. 10, 2014.
Komet Precision Tools GmbH & Co. KG, Komet Group, MO3Speed Catalog, 2005, pp. 1-16, Germany.
Sep. 19, 2016 First office action.
Apr. 28, 2017 Office action (3 months).

* cited by examiner

AUTOMATIC BALANCING DEVICE FOR BORING HEADS

BACKGROUND OF THE INVENTION

Field of the Invention

The present invention relates to a boring head, and particularly to a device for automatically balancing a rotary boring head used for finishing high precision bores.

Description of Related Art

Boring heads for finishing high precision bores typically include a cartridge with a cutting insert that is radially adjustable to set the boring head diameter and to maintain the tool diameter necessary to compensate for wearing of the cutting insert. Typically, the boring head only has a single position where the center of gravity of the movable parts of the boring and the center of gravity of the cartridge are balanced about the rotation axis of the boring head. Adjustment of the cartridge and cutting insert can cause unbalancing of the boring head, which may lead to undesirable geometric deviations of the bore during the machining process. Minimizing such deviations is critical for such processes. Furthermore, boring heads are commonly used at higher cutting speeds where even a small imbalance is exaggerated thereby further increasing the need for the tool to be properly balanced.

Certain boring head designs have addressed this problem by providing a balancing ring that is adjusted manually to properly balance the boring head. Other boring head designs, such as the one shown in U.S. Pat. No. 8,727,678, include a system that automatically balances the boring head during adjustment of the cutting tool. This automatic balancing arrangement, however, includes a complex mechanism that is expensive to manufacture and provides an arrangement with an inherent imbalance along the length of the rotational axis.

SUMMARY OF THE INVENTION

In one embodiment, a boring head includes a housing having a first end configured to be coupled to a machine tool and a second end positioned opposite from the first end with the housing defining a central passageway. The boring head also includes a diameter adjustment mechanism comprising a sliding holder received by the housing and movable relative to the housing with the sliding holder configured to be coupled to a cutting insert and a balancing mechanism having a balancing mass. The balancing mechanism is configured to move the balancing mass when the sliding holder is moved. The balancing mass is aligned with the sliding holder in a direction extending about perpendicular to a longitudinal axis of the housing.

The sliding holder may define an opening that receives the balancing mass. The balancing mechanism may further include a lever rotatable about a pivot secured to the housing, a first guide pin secured to the sliding holder, and a second guide pin secured to the balancing mass, where movement of the sliding holder is transferred to the balancing mass via the first guide pin, lever, and second guide pin. The lever may define first and second elongated guide openings, with the first elongated guide opening receiving the first guide pin and the second elongated guide opening receiving the second guide pin. The first and second guide pins may be spaced from each other in a direction extending along the longitudinal axis of the housing. The boring head may further include a safety pin secured to the housing, with the balancing mass defining a recess that receives a portion of the safety pin, and where the safety pin is configured to limit radial movement of the balancing mass. The boring head may further include a cartridge secured to the sliding holder and a cutting insert secured to the cartridge, with the cartridge circumferentially opposed to the balancing mass. The boring head may include a secondary balancing mass received by the balancing mass.

The diameter adjustment mechanism may include a sliding pin received within the passageway of the housing, with the sliding pin having a main body and an angled portion extending from the main body, and a dial received by the housing and rotatable relative to the housing, where rotation of the dial causes movement of the sliding pin. The sliding holder may define an opening having an angled surface that receives the angled portion of the sliding pin, and where movement of the sliding pin causes radial movement of the sliding holder and the balancing mass. The angled surface of the sliding holder may define a first angle relative to the longitudinal axis of the housing and the angled portion of the sliding pin may define a second angle relative to the longitudinal axis of the housing. The first angle may be about equal to the second angle, with the sliding pin movable in a direction extending along the longitudinal axis to cause movement of the movement member in a direction extending about perpendicular to the longitudinal axis. The sliding pin may include a translation member secured to the sliding pin, with the translation member having a threaded surface that cooperates with a threaded surface of the dial. The translation member may include a thread adjustment arrangement configured to reduce backlash between the threaded surfaces of the translation member and the dial. The thread adjustment arrangement may be embodied as first and second extensions defined by a slit in the translation member adjacent to the threaded surface of the translation member, and a fastener received within a threaded passageway extending through the slit, with movement of the fastener causes an increase or decrease of a distance between the first and second extensions.

In a further embodiment, a boring head includes a housing having a first end configured to be coupled to a machine tool and a second end positioned opposite from the first end, with the housing defining a central passageway. The boring head also includes a diameter adjustment mechanism having a sliding holder received by the housing and movable relative to the housing, with the sliding holder configured to be coupled to a cutting insert, and a sliding pin received within the passageway of the housing. The sliding pin has a main body, an angled portion extending from the main body, and a translation member having a threaded surface. The diameter adjustment mechanism also includes a dial received by the housing and rotatable relative to the housing. The dial has a threaded surface that cooperates with the threaded surface of the translation member, where rotation of the dial causes movement of the sliding pin.

The boring head may further include a balancing mechanism having a balancing mass, a lever rotatable about a pivot secured to the housing, a first guide pin secured to the sliding holder, and a second guide pin secured to the balancing mass, where the balancing mechanism is configured to move the balancing mass when the sliding holder is moved, and where movement of the sliding holder is transferred to the balancing mass via the first guide pin, lever, and second guide pin. The translation member may include a thread adjustment arrangement configured to reduce backlash between the threaded surfaces of the translation member and the dial. The thread adjustment arrangement may include first and second extensions defined by a slit in the translation member adjacent to the threaded surface of the translation member, and a fastener received within a threaded passageway extending through the slit, where movement of the fastener causes an increase or decrease of a distance between the first and second extensions.

In another embodiment, a method of automatically balancing a boring head having a housing, a sliding pin, and a diameter adjustment mechanism comprising a sliding holder movable relative to the housing and configured to be coupled to a cutting insert is provided. The method includes connecting a balancing mass to the sliding holder via a lever that transmits radial movement of the sliding holder to the balancing mass, and aligning the balancing mass with the sliding holder in a direction extending about perpendicular to a longitudinal axis of the housing.

The method may further include attaching the lever to the housing via a pivot, connecting the sliding holder to the lever via a first guide pin, and connecting the balancing mass to the lever via a second guide pin.

BRIEF DESCRIPTION OF THE DRAWINGS

Some of the advantages and features of the preferred embodiments of the invention have been summarized hereinabove. These embodiments, along with other potential embodiments of the device, will become apparent to those skilled in the art when referencing the following drawings in conjunction with the detailed descriptions as they relate to the figures.

DETAILED DESCRIPTION OF THE INVENTION

Figure 1:
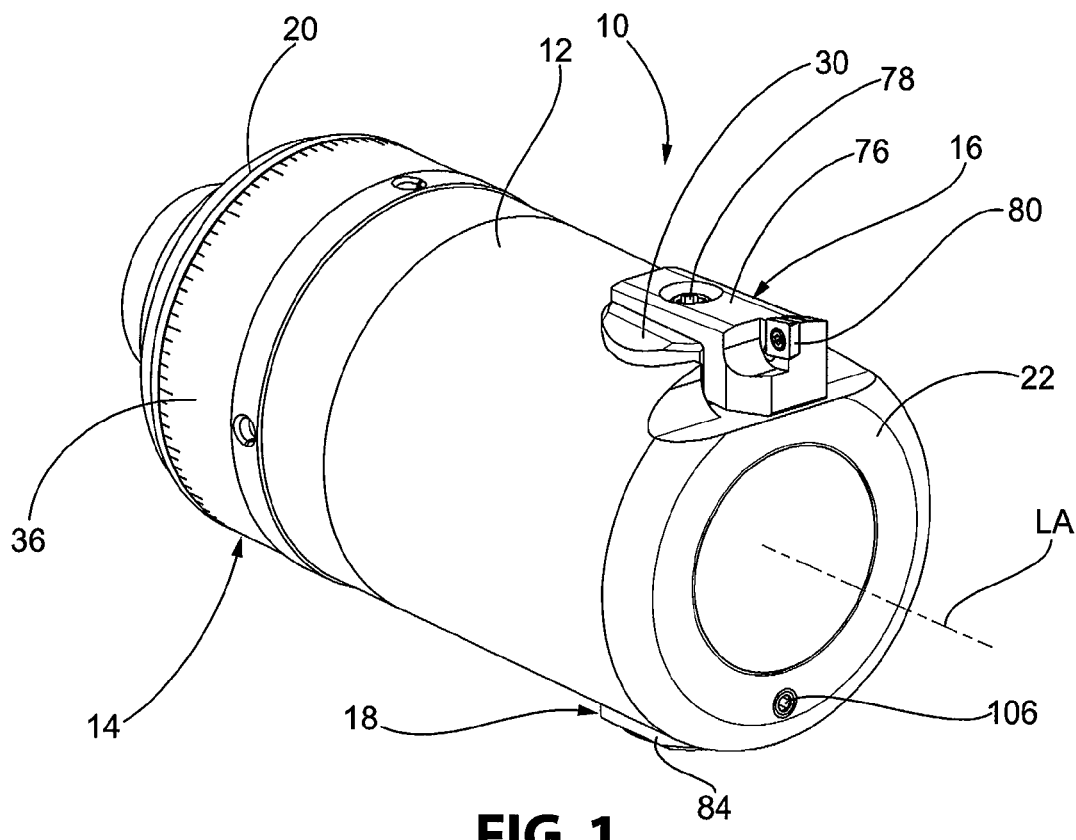
FIG. 1 is an isometric view of a boring head according to one embodiment of the present invention.

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Referring to FIGS. 1-5, one embodiment of a boring head 10 includes a housing 12, a diameter adjustment mechanism 14, an insert assembly 16, and a balancing mechanism 18. The diameter adjustment mechanism 14 is configured to selectively move the insert assembly 16 in a radial direction to adjust the diameter of the boring head 10. The balancing mechanism 18 is configured to move in an opposite radial direction when the insert assembly 16 is moved to balance the boring head 10. The housing 12 includes a first end 20 configured to be coupled to a machine tool (not shown) and a second end 22 positioned opposite from the first end 20. The first end 20 of the housing 12 may be coupled to the machine tool via any suitable arrangement. The housing 12 defines a central passageway 24, shown in FIG. 3, extending along a longitudinal axis LA of the housing 12 to receive at least a portion of the diameter adjustment mechanism 14. The housing 12 is generally cylindrical, although other suitable shapes may be utilized, and may be formed from one or more components. The insert assembly 16 and the balancing mechanism 18 oppose one another about the longitudinal axis LA and are positioned at about the second end 22 of the housing 12, although other suitable positioning on the housing 12 may be utilized.

Referring to FIGS. 3, 3A, 4, and 5, the diameter adjustment mechanism 14 includes a sliding holder 30 received by a transverse opening 32 defined by the housing 12, a sliding pin 34 received within the central passageway 24 of the housing 12, and an external dial 36 received within a recess 38 defined by the housing 12. The sliding holder 30 has a first end 40 and a second end 42 and is generally rod-shaped, although other suitable shapes may be utilized. The sliding holder 30 is configured to move in a traverse direction that is about perpendicular to the longitudinal axis LA of the housing 12. The second end 42 of the sliding holder 30 defines an opening 44 that is configured to receive at least a portion of the balancing mechanism 18. The sliding holder 30 also defines a central opening 46 intermediate the first and second ends 40, 42 of the sliding holder 30 that includes an angled surface 48. The sliding pin 34 has a main body 50 and an angled portion 52 extending from the main body 50 that is received by the central opening 46 of the sliding holder 30. The purpose of this arrangement is to longitudinally displace the sliding pin 34 such that the angled portion 52 engages the sliding holder 30 and transversely displaces the sliding holder 30 with the insert assembly 16 attached thereto. However, as will be discussed, this same longitudinal motion of the sliding pin 34 also displaces the balancing mechanism 18. The angled surface 48 of the sliding holder 30 defines a first angle A relative to the longitudinal axis LA of the housing 12 and the angled portion 52 of the sliding pin 34 defines a second angle B relative to the longitudinal axis LA of the housing 12. The first angle A of the angled surface 48 is about equal to the second angle B of the angled portion 52 of the sliding pin 34. The sliding pin 34 also includes a translation member 54 secured to the main body 50 of the sliding pin 34, although the translation member 54 may also be formed integrally with the sliding pin 34. The translation member 54 includes threaded surfaces 56 that cooperate with a threaded surface 58 of the dial 36.

Figure 4:
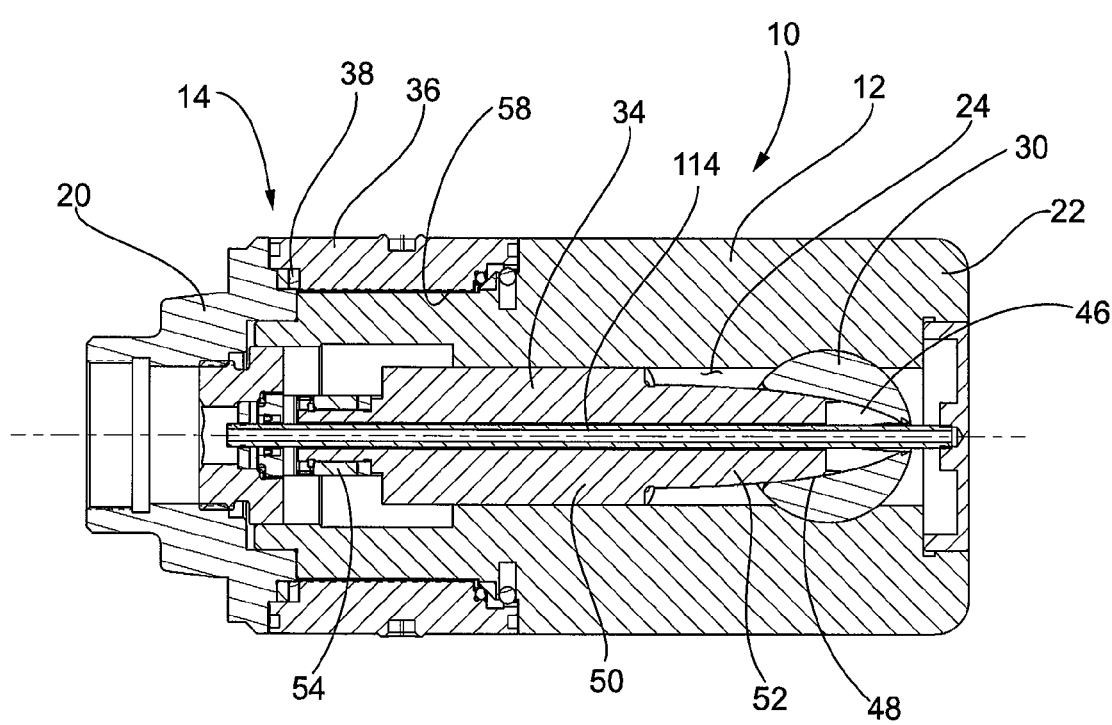
FIG. 4 is a cross-sectional view of the boring head of FIG. 1 taken along line 4-4 of FIG. 2.

Referring again to FIG. 4, although the angled portion 52 of the sliding pin 34 and the opening 44 of the sliding holder 30 appear to taper or narrow in diameter as each extends toward the second end 22 of the housing 12, the angled portion 52 and the opening 44 each have a consistent diameter and do not taper as each extends toward the second end 22 of the housing 12. As the cross-section of FIG. 4 is taken at a mid-point of the housing 12 and the angled portion 52 and the opening 44, which are circular, each extend at their respective angles A, B, the apparent tapering shown in FIG. 4 is merely the result of an incrementally smaller portion of the diameter of the angled portion 52 and the opening 44 being captured by the cross-section.

Figure 3:
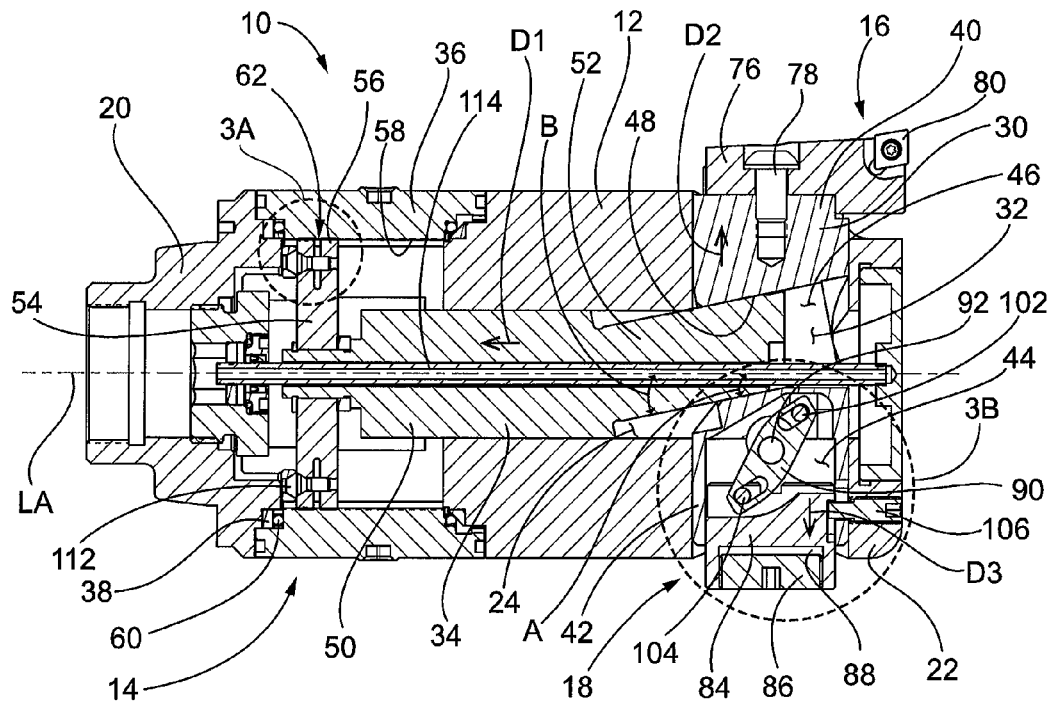
FIG. 3 is a cross-sectional view of the boring head of FIG. 1 taken along line 3-3 of FIG. 2, showing a maximum stroke of the boring head.
Figure 5:
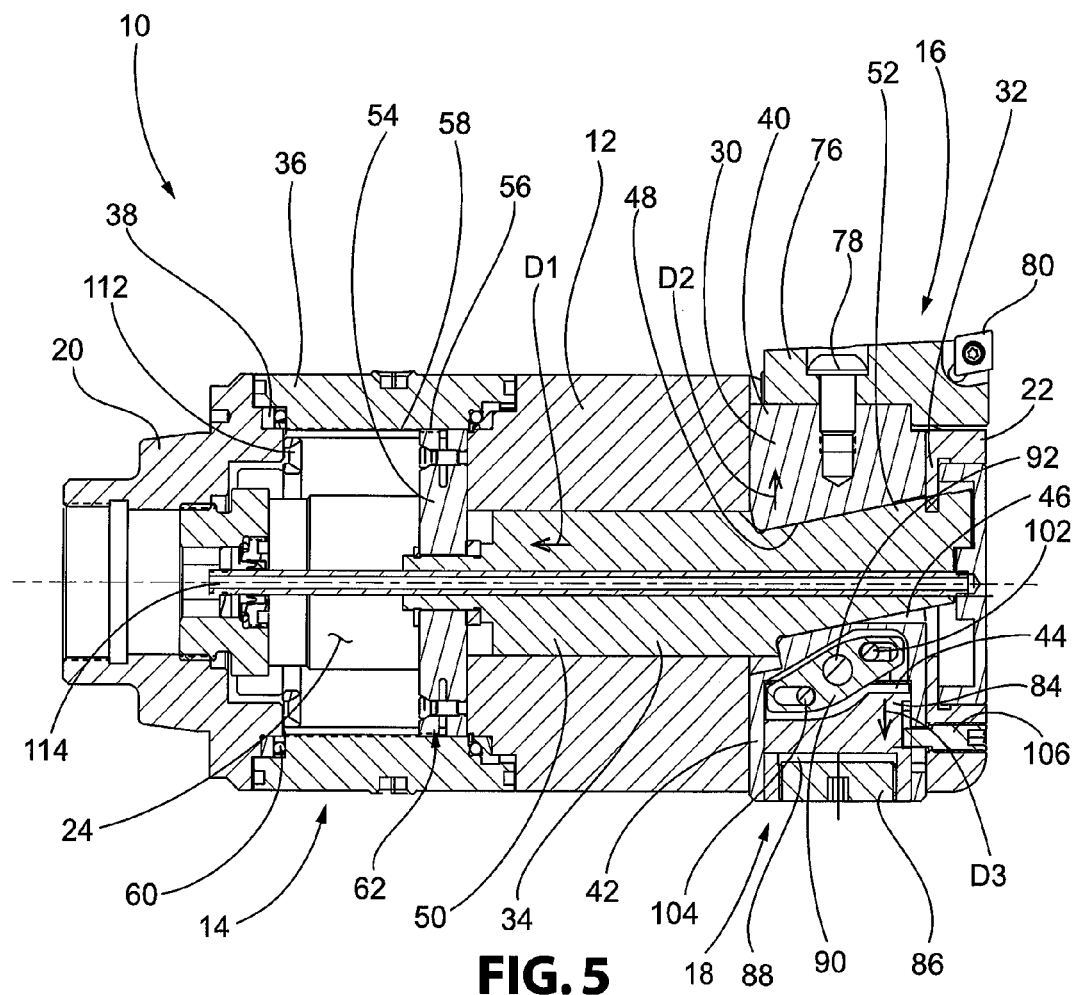
FIG. 5 is a cross-sectional view of the boring head of FIG. 1 taken along line 3-3 of FIG. 2, showing a minimum stroke of the boring head.

Referring to FIGS. 1, 3, and 5, the dial 36 is generally ring-shaped and received within the correspondingly shaped annular recess 38 of the housing 12, although other suitable shapes and arrangements may be utilized. The dial 36 is rotatable relative to the housing 12 and may include one or more bearing arrangements 60 to facilitate the rotation of the dial 36 about the housing 12. As discussed in more detail below, rotation of the dial 36 is transferred to the sliding pin 34 via the translation member 54, which causes radial movement of the sliding holder 30 and the insert assembly 16 in a direction perpendicular to the longitudinal axis LA of the housing 12. The dial 36 is externally graduated to provide an indication on the amount of radial movement of the insert assembly 16 for a predetermined angle of rotation of the dial 36.

Figure 3A:
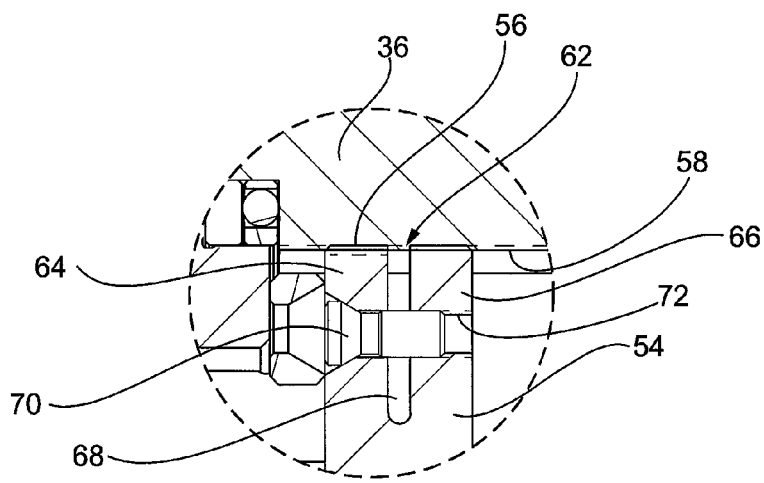
FIG. 3A is detailed view of area 3A shown in FIG. 3.

Referring to FIGS. 3, 3A, and 5, the translation member 54 is generally bar-shaped with each end having the threaded surfaces 56 that engage and cooperate with the threaded surface 58 of the dial 36. Further, the translation member 54 includes a thread adjustment arrangement 62 configured to reduce backlash between the threaded surfaces 56, 58 of the translation member 54 and the dial 36. In particular, due to manufacturing and assembly tolerances, a space or clearance may be formed between threaded components, which can undesirably cause accuracy and precision issues. The thread adjustment arrangement 62 is configured to remove clearance between the threaded surfaces 56 of the translation member 54 and the threaded surface 58 of the dial 36. The thread adjustment arrangement 62 includes first and second extensions 64, 66 defined by a slit 68 in the translation member 54 adjacent to the threaded surfaces 56 of the translation member 54 and a fastener 70, such as a screw, received within a threaded passageway 72 extending through the slit 68. As shown in FIGS. 3 and 5, the thread adjustment arrangement 62 is provided at each end of the translation member 54. Rotation of the fastener 70 within the threaded passageway 72 causes an increase or decrease of a distance between the first and second extensions 64, 66, thereby adjusting the engagement between the threaded surfaces 56 of the translation member 54 with the threaded surface 58 of the dial 36. Accordingly, the spacing between the threaded surfaces 56 of the translation member 54 and the threaded surface 58 of the dial 36 can be adjusted to minimize or eliminate any clearance or backlash thereby improving accuracy and precision when adjusting the boring head 10.

Referring to FIGS. 1-3 and 5, the insert assembly 16 includes a cartridge 76 secured to the first end 40 of the sliding holder 30 via a fastener 78, such as a screw, although other suitable securing arrangements may be utilized. A cutting insert 80 is secured to the cartridge 76 via a fastener, such as a screw, or any other suitable arrangement.

Figure 3B:
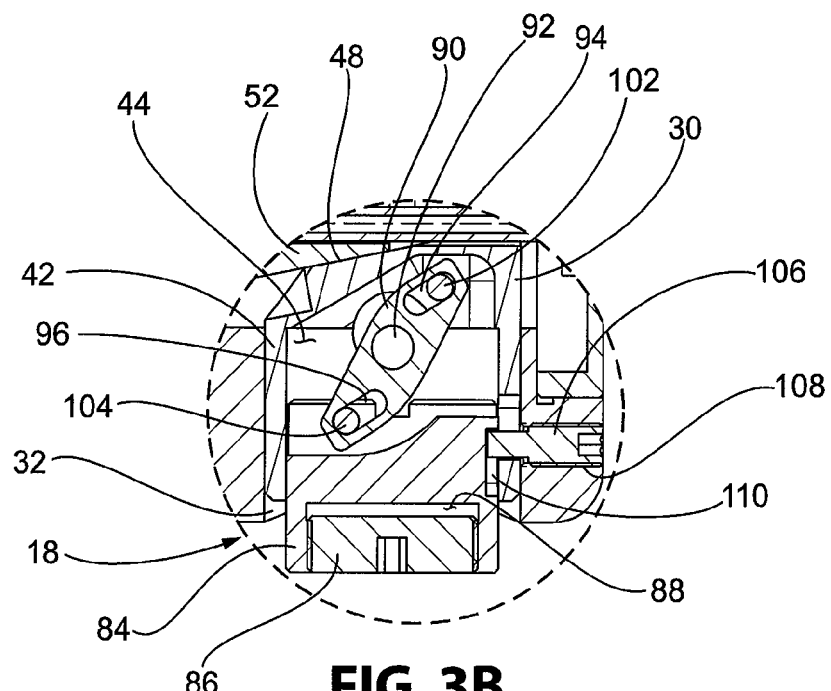
FIG. 3B is detailed view of area 3B shown in FIG. 3.

Referring to FIGS. 3, 3B, and 5, the balancing mechanism 18 includes a balancing mass 84 at least partially received within the opening 44 at the second end 42 of the sliding holder 30 and a secondary balancing mass 86 received within an opening 88 in the balancing mass 84. The balancing mechanism 18 further includes a lever 90 secured to the housing 12 via a pivot 92, which allows the lever 90 to rotate about the pivot 92. The lever 90 defines a first guide opening 94 and a second guide opening 96 that are each elongated. The first guide opening 94 receives a first guide pin 102 secured to the sliding holder 30 and the second guide opening 96 receives a second guide pin 104 secured to the balancing mass 84. Due to the elongate shape of the first and second guide openings 94, 96, the first and second guide pins 102, 104 are able to move within the first and second guide openings 94, 96, respectively. Radial movement of the sliding holder 30, which is facilitated by the dial 36, translation member 54, and sliding pin 34, is transferred to the balancing mass 84 via the first guide pin 102, the lever 90, and second guide pin 104. More specifically, radially outward movement of the sliding holder 30 and insert assembly 16 will cause the first guide pin 102 to move in the same direction thereby causing an anti-clockwise rotation of the lever 90 about the pivot 92 that moves the second guide pin 104 and the balancing mass 84 in an opposite, radially outward direction to compensate for the unbalancing of the boring head 10 due to the movement of the sliding holder 30 and insert assembly 16. The first and second guide pins 102, 104 are spaced from each other in a direction extending along the longitudinal axis LA of the housing 12.

The balancing mechanism 18 also includes a safety pin 106 received within an opening 108 in the second end 22 of the housing 12. The balancing mass 84 defines a recess 110 that receives a portion of the safety pin 106, which prevents the balancing mass 84 from rotating about its central axis and also limits radial movement of the balancing mass 84. In particular, the safety pin 106 may provide a safety feature and restrict movement of the balancing mass 84 if the lever 90 or guide pins 102, 104 fail during high speed rotation of the boring head 10.

Figure 2:
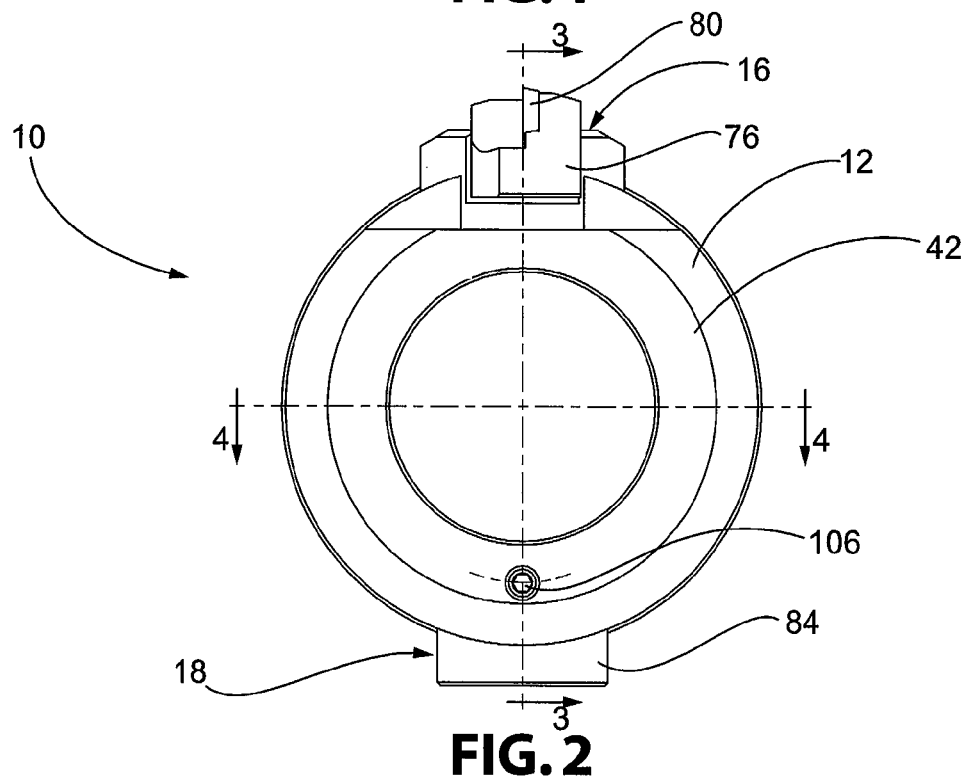
FIG. 2 a front view of the boring head of FIG. 1.

In order to balance the boring head 10, the size and radial movement of the balancing mass 84 is dependent on the degree of unbalance caused by the radial movement of the sliding holder 30 and the insert assembly 16, which is a product of the mass of these components and the displacement of such mass. As shown in FIGS. 2, 3, and 5, the balancing mass 84 is aligned with the sliding holder 30 in a direction extending about perpendicular to the longitudinal axis LA of the housing 12. Thus, the balancing mass 84 and sliding holder 30 are generally positioned along a common plane extending about perpendicular to the longitudinal axis LA of the housing 12. Such positioning provides for improved dynamic balance in addition to providing static balancing of the boring head 10 compared to conventional automatic balancing arrangements where the balancing mass 84 is not aligned with the moveable components in a transverse direction. Although the balancing mass 84 is received within the sliding holder 30, the balancing mass 84 may also be received and move within a portion of the housing 12. Further, as shown in FIGS. 2, 3, and 5, the insert assembly 16 is positioned circumferentially opposite from the balancing mass 84. In particular, with reference to FIG. 2, the insert assembly 16 is positioned at zero degrees with the balancing mass 84 positioned at 180 degrees relative to the circumference of the housing 12.

The balancing mass 84 and secondary balancing mass 86 may be manufactured from any suitable material, such as a high density material including, but not limited to, tungsten alloy. The product of the balancing mass 84 and secondary balancing mass 86 should be equal to the product of the sum of the masses of the sliding holder 30, the cartridge 76, the fastener 78, and the cutting insert 80 and the radial displacement of the components. The secondary balancing mass 86 may be screwed into the correspondingly threaded opening 88 of the balancing mass 84 to provide fine adjustment and balancing of the boring head 10 during manufacture and assembly. After assembly and fine adjustment, the secondary mass 86 may be permanently fixed relative to the balancing mass 84 via an adhesive or other suitable securing arrangement.

Referring to FIGS. 1-5, in order to provide a desired radial movement of the insert assembly 16 with respect to the housing 12, a user rotates the dial 36 about the housing 12 according to the graduations on the dial 36. Rotation of the dial 36 causes axial movement of the translation member 54 due to the engagement between the threaded surface 58 of the dial 36 and the threaded surfaces 56 of the translation member 54. As the translation member 54 is fixed to the sliding pin 34, the sliding pin 34 also moves axially, i.e., in a direction extending along the longitudinal axis of the housing 12, within the central passageway 24 of the housing 12. Movement of the sliding pin 34 in direction D1 will cause a corresponding radial movement of the sliding holder 30 in direction D2 and radial movement of the balancing mass 84 in direction D3. Similarly, movement of the sliding pin 34 opposite to direction D1 will result in radial movements of the sliding holder 30 and the balancing mass 84 in directions opposite to D2 and D3, respectively. More specifically, due to the angled portion 52 of the sliding pin 34 and the angled surface 48 of the sliding holder 30, movement of the sliding pin 34 in direction D1 causes the angled portion 52 of the sliding pin 34 to engage the angled surface 48 of the sliding holder 30 to cause the radial movement of the sliding holder 30. Radial movement of the sliding holder 30 in direction D2 causes the first guide pin 102 secured to the sliding holder 30 to also move in direction D2, which results in the anti-clockwise rotation of the lever 90 about the pivot 92. The anti-clockwise rotation of the lever 90 moves the balancing mass 84 in direction D3 via engagement of the lever 90 with the second guide pin 104 secured to the balancing mass 84. Similarly, movement of the sliding holder 30 in a direction opposite to D2 causes a clockwise rotation of the lever 90 about the pivot 92 and radial movement of the balancing mass 84 in a direction opposite to D3.

Referring to FIG. 3, the boring head 10 is shown with the cutting insert 80 prepared to machine at a maximum diameter, i.e., the boring head 10 is shown with its maximum stroke. Referring to FIG. 5, the boring head 10 is shown with the cutting insert 80 prepared to machine at a minimum diameter, i.e., the boring head 10 is shown with its minimum stroke. The boring head 10 is shown with a stop 112 positioned in the central passageway 24 of the housing 12 adjacent to the first end 20 of the housing 12. The stop 112 is secured to the housing 12 and configured to engage the translation member 54 and limit the stroke of the boring head 10. Depending on the stroke and configuration of the boring head 10, the stop 112 may not be provided. Furthermore, cutting fluid may be delivered to the insert assembly 16 via a central tube 114 extending within the central passageway 24 of the housing 12 and through the sliding pin 34.

In one embodiment, a method of automatically balancing the boring head 10 includes connecting the balancing mass 84 to the sliding holder 30 via the lever 90 to transmit radial movement of the sliding holder 30 to the balancing mass 84, and aligning the balancing mass 84 with the sliding holder 30 in a direction extending about perpendicular to the longitudinal axis LA of the housing 12. The method may also include attaching the lever 90 to the housing 12 via the pivot 92, connecting the sliding holder 30 to the lever 90 via the first guide pin 102, and connecting the balancing mass 84 to the lever 90 via the second guide pin 104.

While certain embodiments of the invention are shown in the accompanying figures and described hereinabove in detail, other embodiments will be apparent to, and readily made by, those skilled in the art without departing from the scope and spirit of the invention. For example, it is to be understood that this disclosure contemplates that, to the extent possible, one or more features of any embodiment can be combined with one or more features of any other embodiment. Accordingly, the foregoing description is intended to be illustrative rather than restrictive.

The invention claimed is:

1. A boring head comprising:
a housing having a first end configured to be coupled to a machine tool and a second end positioned opposite from the first end, the housing defining a central passageway;
a diameter adjustment mechanism comprising a sliding holder received by the housing and movable relative to the housing, the sliding holder configured to be coupled to a cutting insert;
a balancing mechanism comprising a balancing mass, the balancing mechanism being configured to move the balancing mass when the sliding holder is moved, the balancing mass being aligned with the sliding holder in a direction extending about perpendicular to a longitudinal axis of the housing;
the balancing mechanism comprising a lever disposed between the sliding holder and the balancing mass, the lever being rotatable about a pivot;
wherein the diameter adjustment mechanism further comprises a sliding pin received within the passageway of the housing, the sliding pin including an angled portion, the angled portion being oriented at a non-zero angle with respect to the longitudinal axis of the housing;
wherein the sliding holder defines an opening having an angled surface that receives the angled portion of the sliding pin; and
wherein movement of the angled portion of the sliding pin in a first direction, and engagement of the angled portion with the angled surface, causes:
radial movement of the sliding holder in a second direction; and
displacement of the lever to effect radial movement of the balancing mass in a third direction which is opposite to the second direction;
wherein the radial movement of the sliding holder is transferred to the balancing mass via rotation of the lever about the pivot.

2. The boring head of claim 1, wherein the sliding holder defines an opening that receives the balancing mass.

3. The boring head of claim 1, wherein:
the pivot is secured to the housing; and
the balancing mechanism comprises:
a first guide pin secured to the sliding holder; and
a second guide pin secured to the balancing mass, wherein the radial movement of the sliding holder is transferred to the balancing mass via the first guide pin, lever, and second guide pin.

4. The boring head of claim 3, wherein the lever defines first and second elongated guide openings, the first elongated guide opening receiving the first guide pin and the second elongated guide opening receiving the second guide pin.

5. The boring head of claim 3, wherein the first and second guide pins are spaced from each other in a direction extending along the longitudinal axis of the housing.

6. The boring head of claim 3, further comprising a safety pin secured to the housing, the balancing mass defining a recess that receives a portion of the safety pin, wherein the safety pin is configured to limit radial movement of the balancing mass.

7. The boring head of claim 1, further comprising a cartridge secured to the sliding holder and a cutting insert secured to the cartridge, wherein the cartridge is circumferentially opposed to the balancing mass.

8. The boring head of claim 1, further comprising a secondary balancing mass received by the balancing mass.

9. The boring head of claim 1, wherein the sliding pin has a main body, wherein the angled portion of the sliding pin extends from the main body; and the diameter adjustment mechanism further comprises a dial received by the housing and rotatable relative to the housing, wherein rotation of the dial causes movement of the sliding pin.

10. The boring head of claim 9, wherein the angled surface of the sliding holder defines a first angle relative to the longitudinal axis of the housing and the angled portion of the sliding pin defines a second angle relative to the longitudinal axis of the housing, the first angle about equal to the second angle, and wherein the sliding pin is movable in a direction extending along the longitudinal axis causing movement of the sliding holder in a direction extending about perpendicular to the longitudinal axis.

11. The boring head of claim 9, wherein the sliding pin includes a translation member secured to the sliding pin, the translation member having a threaded surface that cooperates with a threaded surface of the dial.

12. The boring head of claim 11, wherein the translation member includes a thread adjustment arrangement configured to reduce backlash between the threaded surfaces of the translation member and the dial.

13. The boring head of claim 12, wherein the thread adjustment arrangement comprises:

first and second extensions defined by a slit in the translation member adjacent to the threaded surface of the translation member; and a fastener received within a threaded passageway extending through the slit, wherein movement of the fastener causes an increase or decrease of a distance between the first and second extensions.

14. A boring head comprising:

a housing having a first end configured to be coupled to a machine tool and a second end positioned opposite from the first end, the housing defining a central passageway;

a diameter adjustment mechanism comprising:

a sliding holder received by the housing and movable relative to the housing, the sliding holder configured to be coupled to a cutting insert;

a balancing mass;

a lever disposed between the sliding holder and the balancing mass, the lever being rotatable about a pivot;

a sliding pin received within the passageway of the housing, the sliding pin having a main body, an angled portion extending from the main body, and a translation member having a threaded surface;

the angled portion of the sliding pin being oriented at a non-zero angle with respect to the longitudinal axis of the housing;

a dial received by the housing and rotatable relative to the housing, the dial having a threaded surface that cooperates with the threaded surface of the translation member, wherein rotation of the dial causes movement of the sliding pin;

wherein the sliding holder defines an opening having an angled surface that receives the angled portion of the sliding pin; and wherein movement of the angled portion of the sliding pin in a first direction, and engagement of the angled portion with the angled surface, causes:

radial movement of the sliding holder in a second direction; and displacement of the lever to effect radial movement of the balancing mass in a third direction which is opposite to the second direction;

wherein the radial movement of the sliding holder is transferred to the balancing mass via rotation of the lever about the pivot.

15. The boring head of claim 14, further comprising a balancing mechanism, the balancing mechanism comprising:

the balancing mass;

the lever;

the pivot being secured to the housing;

a first guide pin secured to the sliding holder; and a second guide pin secured to the balancing mass, wherein the balancing mechanism is configured to move the balancing mass when the sliding holder is moved, and wherein the radial movement of the sliding holder is transferred to the balancing mass via the first guide pin, lever, and second guide pin.

16. The boring head of claim 14, wherein the translation member includes a thread adjustment arrangement configured to reduce backlash between the threaded surfaces of the translation member and the dial.

17. The boring head of claim 16, wherein the thread adjustment arrangement comprises:

first and second extensions defined by a slit in the translation member adjacent to the threaded surface of the translation member; and a fastener received within a threaded passageway extending through the slit, wherein movement of the fastener causes an increase or decrease of a distance between the first and second extensions.

18. A method of automatically balancing a boring head having a housing, a sliding pin, and a diameter adjustment mechanism comprising a sliding holder movable relative to the housing and configured to be coupled to a cutting insert, the method comprising:

connecting a balancing mass to the sliding holder via a lever that transmits radial movement of the sliding holder to the balancing mass, the lever being rotatable about a pivot; and aligning the balancing mass with the sliding holder in a direction extending about perpendicular to a longitudinal axis of the housing;

wherein the diameter adjustment mechanism further comprises a sliding pin received within the passageway of the housing, the sliding pin including an angled portion, the angled portion being oriented at a non-zero angle with respect to the longitudinal axis of the housing;

wherein the sliding holder defines an opening having an angled surface that receives the angled portion of the sliding pin; and wherein movement of the angled portion of the sliding pin in a first direction, and engagement of the angled portion with the angled surface, causes:

radial movement of the sliding holder in a second direction; and displacement of the lever to effect radial movement of the balancing mass in a third direction which is opposite to the second direction;

wherein movement of the sliding holder is transferred to the balancing mass via rotation of the lever about the pivot.

19. The method of claim 18, further comprising:
attaching the lever to the housing via a pivot;
connecting the sliding holder to the lever via a first guide pin; and
connecting the balancing mass to the lever via a second guide pin.

* * * * *